Feb. 4, 1969 R. E. BROWN ET AL 3,425,334
HEAT ARRESTING GREASE EXTRACTING FILTER ASSEMBLY
Filed May 3, 1967
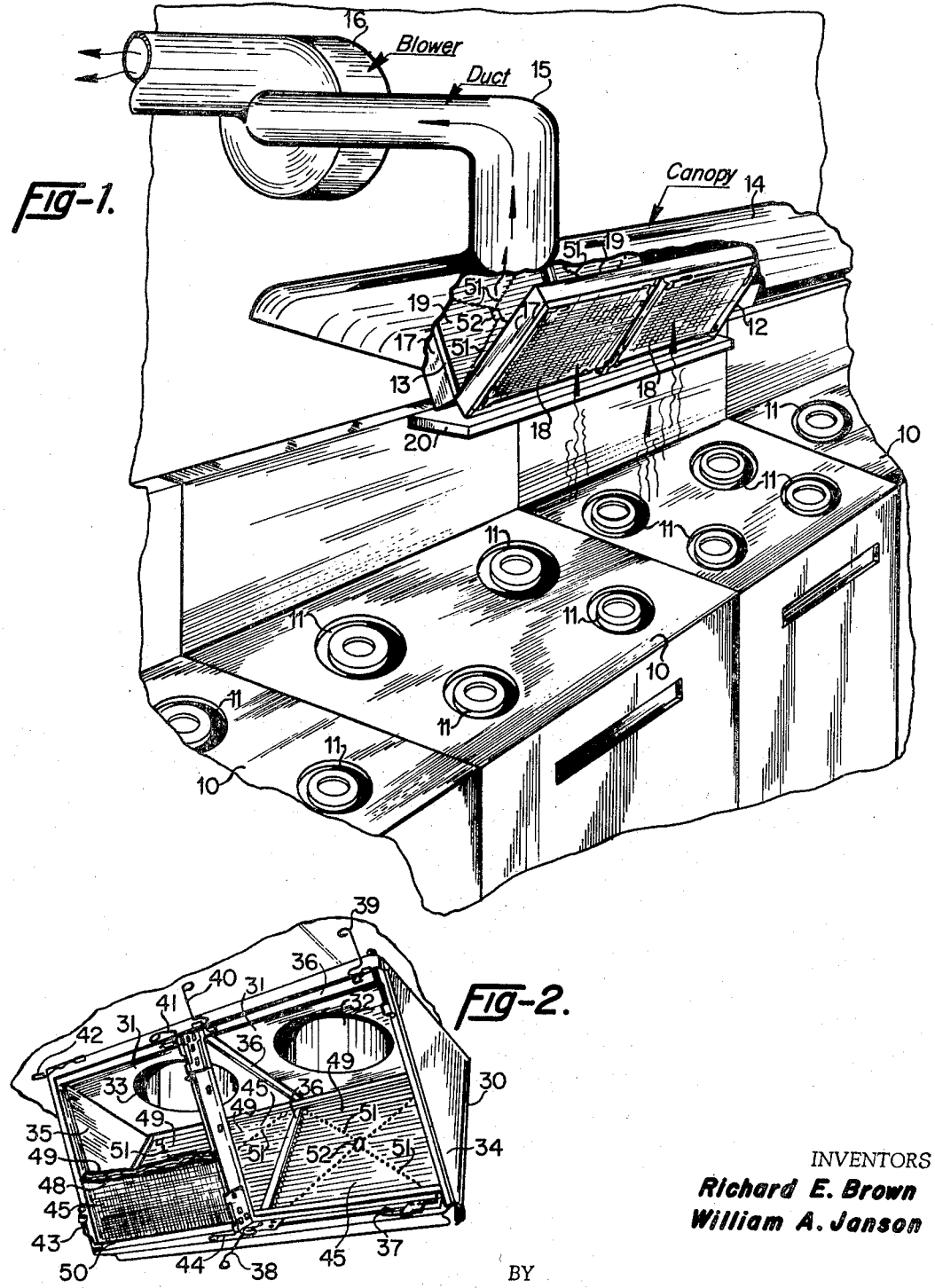
INVENTORS
*Richard E. Brown*
*William A. Janson*
BY
John R. Bronaugh
ATTORNEY

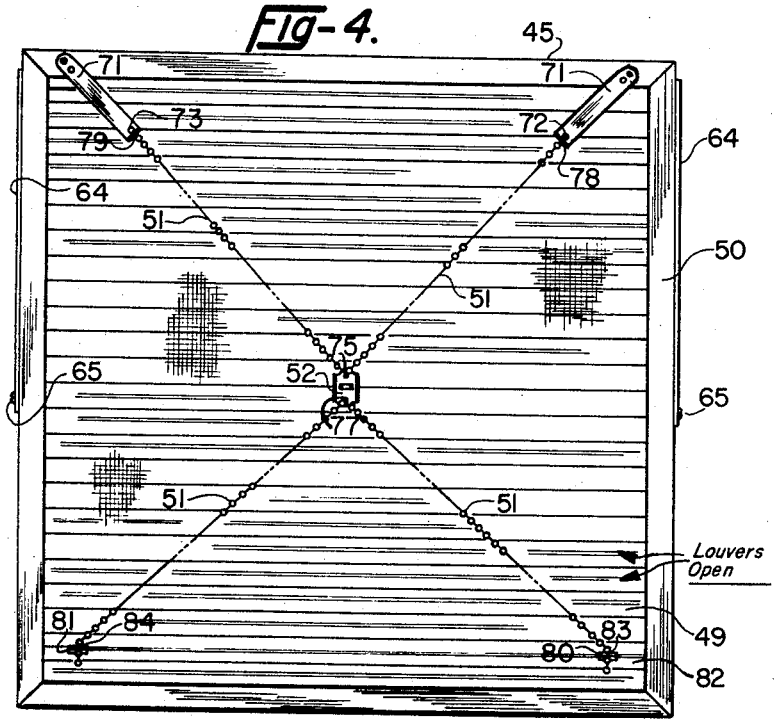
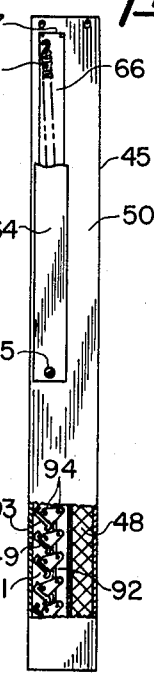
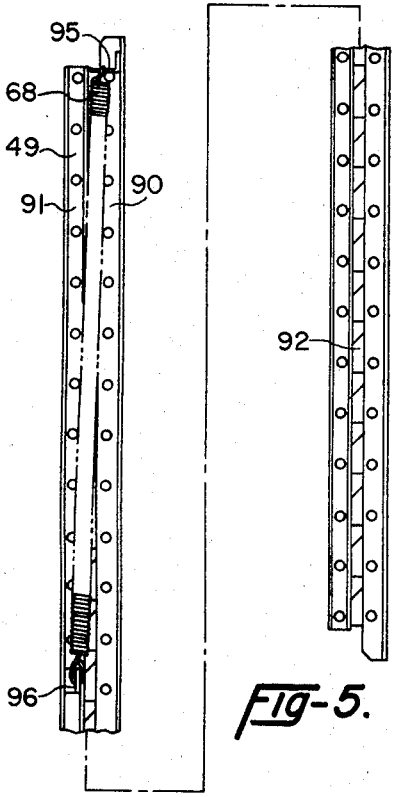
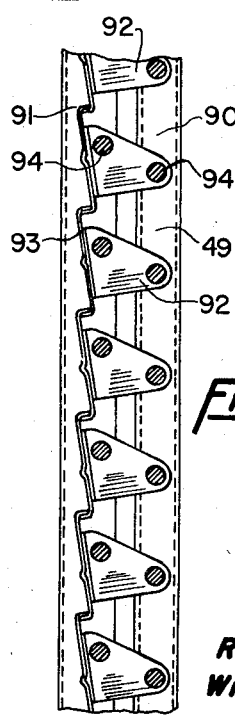
INVENTORS
Richard E. Brown
William A. Janson
BY John R. Bronaugh
ATTORNEY

United States Patent Office 3,425,334
Patented Feb. 4, 1969

3,425,334
HEAT ARRESTING GREASE EXTRACTING FILTER ASSEMBLY
Richard E. Brown, Lyndhurst, and William A. Janson, Pepper Pike, Ohio, assignors to North American Rockwell Corporation, a corporation of Delaware
Filed May 3, 1967, Ser. No. 635,923
U.S. Cl. 98—115      1 Claim
Int. Cl. F23j 11/00; F23l 17/04; E06b 7/08

ABSTRACT OF THE DISCLOSURE

A grease extracting filter and a heat arrestor combination having a temperature sensitive fusible link in cooperation with an extension spring to close the louvers and prevent heat and flame from passing through the louvers above a predetermined temperature level.

BACKGROUND

The invention relates to flame arresting grease filters for kitchen range canopies or range hoods in general. In the usual canopy maintained over kitchen ranges a ventilation system is employed to collect and exhaust cooking gasses and heat away from and out of the kitchen. In so doing the ventilation system causes the grease laden gasses and heat to pass through the grease filters prior to being exhausted to the outside air through the exhaust ducts.

Although the usual grease filter is designed to collect the vaporized grease particles carried by the gasses and heat, nevertheless some grease particles pass through the grease filter without being collected and condense on the surfaces of the relatively cool canopy and ventilation exhaust ducts. The condensed grease particles collect and build up on these surfaces over a period of time thereby presenting a potential fire hazard in the canopy and ventilation exhaust duct system.

Flame arresting devices have been incorporated in kitchen range canopies which embody a damper baffle biased in a position to normally permit the passage of cooking gasses and heat from the canopy region into the ventilation exhaust duct system but which automatically closes the exhaust duct ports when a thermal condition is reached sufficient to rupture the mechanism biasing the damper baffle in its normally open position. In the event of a flame passing through the filter such devices tend to isolate the passage of fire through the grease laden exhaust duct system but are ineffective in controlling fire in the canopy region and, for example, are disclosed in United States Patent No. 2,862,437 issued Dec. 2, 1958 to C. O. Smith et al. for ventilating device, and United States Patent No. 3,055,285 issued Sept. 25, 1962 to A. K. Gaylord for kitchen ventilating system. Other flame arresting devices have been incorporated in kitchen range canopies which embody a grease filter incorporating in its structure either as a reticulated body itself or as a coating upon the filter a heat sensitive material which, when subjected to excessive temperatures, will become activated by the heat so as to expand and close the passages or interstices through the reticulated body or coating, thereby providing a substantially imperforate material which precludes the passage of flame through the grease filter. These devices are advantageous over the above devices in that they close off the canopy region when heat or flame above a predetermined temperature level attempts to pass through the filter but are disadvantageous in that they are extremely expensive to manufacture. Such devices are disclosed, for example, in United States Patent No. 2,279,791, Apr. 14, 1942, to C. G. Lamb for Fire Screen.

The present invention is advantageous over any of the above devices in that a relatively low cost competitively priced filter-heat arrestor assembly is provided which prevents heat or flame from igniting grease particles in the canopy or range hood region.

SUMMARY

In its preferred embodiment the invention provides a novel simple heat arresting grease extracting filter assembly whereby heat or flame is precluded from passing through the assembly and igniting grease particles adhering to the range canopy and exhaust duct walls. A grease extracting filter assembly and a louvered heat arrestor assembly are removably disposed adjacent each other within a housing adapted for insertion into a range exhaust canopy or hood normally positioned a few feet above a cooking range. Flame or heat from the range environment drawn to the canopy for exhaustion to the outside air melts a link having a predetermined fusing temperature whereby springs stretched in opposition to the link immediately close the louvers.

With the foregoing general considerations in mind it is an object of the present invention to provide an improved heat arresting grease filter assembly for kitchen exhaust systems which:

(a) is readily installed in existing exhaust canopy systems;

(b) automatically isolates the entire exhaust canopy and duct system from fire originating external to the exhaust system;

(c) embodies a re-usable heat arrestor which can be readily equipped with a new fusible link in the event a fire has fused the original fusible link and activated the heat arrestor; and (d) is removable from the exhaust canopy for inspection, servicing and routine cleaning.

BRIEF DESCRIPTION OF DRAWINGS

FIGURE 1 is a perspective view with parts broken away showing two heat arresting grease extracting filter assemblies installed in the exhaust canopy of a typical kitchen installation;

FIGURE 2 is an enlarged perspective view of an exhaust canopy analogous to the exhaust canopy of FIGURE 1 showing heat arresting grease extracting filter assemblies embodying the principles of the invention in stalled therein;

FIGURE 3 is an end view of the heat arresting grease extracting assembly with parts broken away showing the preferred orientation of the filter and louver assemblies;

FIGURE 4 is a rear elevation view of the heat arresting grease extracting assembly shown in FIGURE 3 in which the louver assembly is shown as the rearward element;

FIGURE 5 is an end elevation view of the extension spring-louver assembly in which the louvers are shown in an open relationship; and FIGURE 6 shows the details of the louver assembly in a closed relationship.

PREFERRED EMBODIMENTS

FIGURE 1 shows a typical restaurant kitchen installation having a row of cooking ranges 10 with open burners 11 arranged along the top surfaces of the ranges 10. As shown in the figure gasses formed from cooking and stove heat are drawn from the top surface environment of the cooking ranges 10 upwardly through heat arresting grease extracting assemblies 12 and 13 and the range canopy 14 into a conventional ventilating duct system 15. An exhaust blower 16 positioned in the duct system 15 exhausts the filtered gasses to the outside air.

The two heat arresting grease extracting assemblies 12 and 13 are identical and are more fully described herein by reference to FIGURES 2–6. However, referring to FIGURE 1, it will be seen that the assemblies 12 and 13 each consists of three elements: a channel frame housing 17 which is adapted for insertion into an opening (not shown) of the range canopy 14, two grease extracting filters 18 shown as the frontwardly gas receiving surfaces contained within the housing 17 of assembly 12, and two heat arrestors 19 tandemly contained within the housing 17 as the rearward elements of assembly 13. Not shown in the figure, of course, are the rearward heat arrestor units contained within the housing 17 of assembly 12 and the grease extracting filters disposed as the frontward elements contained within housing 17 of assembly 13. Also shown in the figure is a grease collecting drip tray 20. The assemblies 12 and 13 are designed so as to be removably inserted into the range canopy 14. To facilitate installation, cleaning or repair, the grease extracting filters 18 and the heat arrestors 19 are also removably enclosed within the channel frame housing 17.

Referring now to FIGURE 2, the reference numeral 30 indicates a filter cabinet which is analogous to the range canopy 14 shown in FIGURE 1. In FIGURE 2 cabinet 30 is shown having a top surface 31 with two exhaust duct ports 32 and 33 suitable for connection to an exhaust duct system as shown in FIGURE 1, end walls 34 and 35 which are V shaped, and a relatively narrow frame member 36 which defines four openings in filter cabinet 30, each opening being adapted to receive and removably retain by means of four locking retaining assemblies 37, 38, 39, and 40, and 41, 42, 43, and 44, a heat arresting grease extracting assembly (only three such assemblies are shown in FIGURE 2), as shown by numeral 45.

The heat arresting grease extracting assemblies 45 as described with reference to FIGURE 1 and as more fully described herein with reference to FIGURES 3–6 each consist of a filter 48 (shown as the frontwardly gas receiving element) and a louver assembly 49 (shown as the rearwardly gas receiving element) contained within a frame housing as shown by reference numeral 50. The filter element 48 may be of any suitable construction but preferably is made of crimped wire mesh baffles of various densities. Such filters are advantageous in that they tend to prevent transmission of flame by rapidly dissipating heat. The frame housing 50 is provided with holes (not shown) drilled or punched therein to facilitate drainage of grease and other condensate from the filter 48 into a grease collecting drip tray (not shown in FIGURE 2), as shown by reference numeral 20 in FIGURE 1.

It will be noted from FIGURE 2 that the louver assembly 49 is shown with the individual louvers in an open relationship. As will be explained in greater detail with reference to FIGURES 3–6, the louvers are releasably held in an open relationship by the link chains 51 and the temperature fusible link 52.

In FIGURE 3 an end view of the heat arresting grease extracting assembly 45 is shown. Here a portion of the frame 50 is broken away to show the relative positions of the louver assembly 49 and the grease extracting filter 48. Although it is preferable that assembly 45 is disposed so that the filter 48 is the frontward element thereby initially receiving heating and cooking gasses, it should be clear to one skilled in the art that the positions of the two elements 49 and 48 may be reversed so that the louver assembly 49 is disposed as the frontward gas receiving element. Also shown in FIGURE 3 is a partially broken away access door 64 which is attached to the frame 50 by sheet metal screw 65 on one end, being retained in place on the other end by a right angle bend of a portion of access door 64 (not shown) inserted into the spring access opening 66 at surface 67 under compression. As shown in FIGURE 3 a helical extension spring 68 is positioned within the access opening 66 in a manner urging the normally open louvers of louver assembly 49 into a closed relationship, as shown in FIGURE 6, upon separation of the temperature fusible link 52 shown in FIGURE 4. Although not shown in FIGURE 3 it can be seen from FIGURE 4 that two helical extension springs, one on each side of frame 50, are disposed within access openings covered by access doors 64.

In FIGURE 4 a rear elevation view of the heat arresting grease extracting assembly 45 is shown in which the louver assembly 49 is positioned within frame 50 as the rearward element. In this figure the individual louvers of louver assembly 49 are disposed in a normally open relationship to permit heat and gasses which have passed through the filter 48 (shown in FIGURE 3) to be drawn through the range canopy and into the exhaust duct system as described with reference to FIGURE 1.

Looking now to the elements shown in FIGURE 4 it is seen that the upper link chain 51 and the lower link chain 51 are cooperating together through the temperature-fusible link 52 to maintain the louver assembly 49 in its normally open relationship. The two upper chain brackets 71 are attached to the top portion of frame 50 and function as expedient extensions of the frame 50 to permit the ends 78 and 79 of the upper link chain 51 passing through the hole 75 of the temperature-fusible link 52 to be securely attached thereto at points 72 and 73. Two lower chain brackets 80 and 81 are attached to one of the louvers near the bottom of the louver assembly 49, for example, louver 82. Both of these lower chain brackets 80 and 81 have downwardly opening slots therein which permit the ends 83 and 84 of the lower link chain 51 passing through hole 77 of the temperature-fusible link 52 to be slidably and removably affixed thereto. Both upper and lower link chains 51 are of such length that the louver assembly 49 will be held in an open louver relationship when the ends 83 and 84 of the lower link chain 51 are respectively engaged in the openings of the lower chain brackets 80 and 81. Upon the engagement of the lower link chain 51 with the brackets 80 and 81 the helical extension springs disposed within recesses on each side of frame 50 are extended. These extended springs, one of which is shown in FIGURE 3 at numeral 68, possess potential energy sufficient to instantaneously move the louvers of the louver assembly 49 into a closed relationship upon a break in the link chain-fusible link system. The fusible link 52 is comprised of a material which will melt at a predetermined temperature. The link 52 will separate at this predetermined temperature thereby breaking the link chain-fusible link system whereby the helical extension springs will close the louvers. A suitable material for the fusible link 52 is an alloy of tin, lead, and bismuth having a melting point of about 286° Fahrenheit. As is apparent to those skilled in the art any suitable material having a desirable predetermined melting point may be used for the fusible link 52. It is also apparent that the number of fusible links 52 may be increased in the link chain-fusible link system and that the entire link chains 51 may be comprised of a suitably predetermined fusing material.

In FIGURE 5 an end elevation view of the extension spring-louver assembly is shown wherein the louvers are held in their normally open relationship. In FIGURES 5 and 6 it is seen that the louver assembly 49 comprises two slidable bars 90 and 91 upon which are movably affixed a number of rotatable angle brackets 92. Although only one end of the louver assembly 49 is shown in FIGURES 5 and 6 it will be clear to those skilled in the art that duplicate slidable bars and angle brackets are also provided at the other end of louver assembly 49. Each rotatable angle bracket 92 has permanently affixed thereto a louver 93 which moves with the rotation of the angle brackets 92. These angle brackets 92 are all caused to cooperatively rotate in relation to the relative movements of bars 90 and 91. Thus, with the bar 90 held in a fixed position within frame 50, movement of bar 91 will cause the respective angle brackets 92 to rotate about points 94, shown in FIGURE 6, thereby opening or closing the louvers 93, depending upon the direction of movement of bar 91. For example, in FIGURE 6, if bar 91 moves in an upward direction the brackets 92 will rotate about points 94 in a manner which opens the louvers 93. Conversely, if bar 91 moves in a downward direction the louvers 93 will close. Looking again to FIGURE 5 it is seen that the louver assembly 49 is disposed with its individual louvers in an open relationship. As such, the extension spring 68, which is affixed to bar 90 by means of bracket 95 and to bar 91 by means of bracket 96, is stretched. In this stretched relationship, as explained hereinabove, spring 68 is disposed to immediately move bar 91 so that the louvers are in a closed relationship as shown in FIGURE 6 as soon as permitted to close by release of the chains 51 upon fusion of the link 52.

Referring again to FIGURES 1-4 if a fire breaks out while cooking the flame will be drawn to the exhaust canopy region due to the exhaust blower arranged to exhaust heat and cooking gasses to the outside air. However, by the construction of the present invention, the flame will encounter a fusible link 52 which is constructed of a material having a suitable predetermined fusing temperature. The link 52 will melt and separate instantaneously thereby releasing the link chains 51 which together maintain the louvers of louver assembly 49 in an open relationship. Although the louvers are no longer held in an open relationship stretched springs 68 are disposed to immediately urge the louvers into a closed relationship thereby preventing flame and heat from being transmitted through the filter assembly 48. After the flame has been extinguished the filter assembly 48 may be replaced, if damaged, and the louver assembly 49 may be reset by means of a new fusible link 52 in combination with the existing link chains 51. Thus any propensity for the flame to pass through the filter assembly 48 to ignite grease particles accumulated in the exhaust canopy and exhaust duct region is thereby eliminated.

As is apparent to those skilled in the art the invention can be interlocked with the exhaust duct blower whereby the blower fan is shut off upon disengagement of the heat arrestor-filter assembly from the canopy. It will also be apparent that the exhaust blower as well as fire extinguishing apparatus can be interlocked to the fusible link. In this instance upon fusion and separation of the link the blower fan is shut off thereby reducing any possible "forge" effect and fire extinguishing apparatus is activated.

The present invention may be embodied in other specific forms without departing from the spirit or essential characteristics thereof. The present embodiments are therefore to be considered in all respects as illustrative only and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a kitchen ventilating exhaust system, a heat arresting grease extracting filter assembly comprising a planar filter panel, means removably mounting said panel at the inlet of said system for extracting grease particles from air passing into said system through said filter, and heat arresting louver means positioned in adjacent parallel relation to the downstream side of said filter panel including means to automatically prevent flame and heat above a predetermined temperature level from passing through said filter and heat arresting means and igniting grease accumulations in said exhaust system, said heat arresting means comprising a louver assembly having a plurality of parallel louvers movable between open positions in which air can pass between adjacent ones of said louvers and closed positions in which adjacent ones of said louvers overlap to prevent passage of air through said heat arresting means, stationary frame means, a movable bar at each end of said louvers reciprocable between first and second positions relative to said stationary frame, a plurality of brackets each fixed to an end of a respective one of said louvers and pivotally secured to the respective bar and said stationary frame such that said louvers are in said open positions when said bars are in said first positions and in said closed positions when said bars are in said second positions, spring means interconnecting at least one of said bars and said frame for biasing said bars to said second positions and said louvers to said closed positions, chain means interconnecting at least one of said louvers and said frame to normally oppose said spring means and maintain said bars in said first positions and said louvers in said open positions, said chain means including a fusible link located near the center of said louvers and filter panel and adapted to fuse upon the attainment of a predetermined temperature level to disconnect said chain means intermediate said frame and said louver to permit said spring means to move said bars to said second positions and said louvers to said closed positions, thereby preventing further passage of air through said filters and into said exhaust system.

References Cited
UNITED STATES PATENTS

| | | | |
|---|---|---|---|
| 2,862,437 | 12/1958 | Smith et al. | 98—86 XR |
| 3,060,833 | 10/1962 | Pledger | 98—115 |
| 3,247,776 | 4/1966 | Gaylord | 98—115 |
| 3,323,439 | 6/1967 | Weaver et al. | 98—86 XR |
| 3,350,996 | 11/1967 | Rose | 98—86 |

ROBERT A. O'LEARY, *Primary Examiner.*

M. A. ANTONAKAS, *Assistant Examiner.*

U.S. Cl. X.R.

98—86; 55—417, 483, 484